United States Patent
Wong

(10) Patent No.: US 9,028,584 B2
(45) Date of Patent: May 12, 2015

(54) SYSTEM AND METHOD FOR FABRICATION OF 3-D PARTS

(71) Applicant: Composite Materials Technology, Inc., Shrewsbury, MA (US)

(72) Inventor: James Wong, Shrewsbury, MA (US)

(73) Assignee: Composite Materials Technology, Inc., Shrewsbury, MA (US)

( * ) Notice: Subject to any disclaimer, the term of this patent is extended or adjusted under 35 U.S.C. 154(b) by 0 days.

(21) Appl. No.: 13/962,805

(22) Filed: Aug. 8, 2013

(65) Prior Publication Data

US 2014/0106144 A1 Apr. 17, 2014

Related U.S. Application Data

(60) Provisional application No. 61/712,669, filed on Oct. 11, 2012.

(51) Int. Cl.
| | |
|---|---|
| B22F 3/02 | (2006.01) |
| B22F 1/00 | (2006.01) |
| H01M 4/04 | (2006.01) |
| H01M 4/1391 | (2010.01) |
| H01M 4/1397 | (2010.01) |
| H01M 4/485 | (2010.01) |
| H01M 4/505 | (2010.01) |
| H01M 4/525 | (2010.01) |
| H01M 4/58 | (2010.01) |
| H01M 4/62 | (2006.01) |

(52) U.S. Cl.
CPC ....... *B22F 1/0081* (2013.01); *Y10T 428/24917* (2015.01); *B22F 1/004* (2013.01); *B22F 2998/10* (2013.01); *H01M 4/04* (2013.01); *H01M 4/1391* (2013.01); *H01M 4/1397* (2013.01); *H01M 4/485* (2013.01); *H01M 4/505* (2013.01); *H01M 4/525* (2013.01); *H01M 4/5815* (2013.01); *H01M 4/5825* (2013.01); *H01M 4/62* (2013.01); *H01M 4/622* (2013.01); *H01M 4/625* (2013.01); *H01M 4/626* (2013.01); *Y02E 60/122* (2013.01)

(58) Field of Classification Search
USPC .......................................... 419/23, 32; 75/354
See application file for complete search history.

(56) References Cited

U.S. PATENT DOCUMENTS

| | | | |
|---|---|---|---|
| 3,697,255 A | 10/1972 | Baldwin et al. ............ | 75/0.5 AB |
| 5,314,658 A * | 5/1994 | Meendering et al. ........... | 419/33 |
| 5,549,697 A | 8/1996 | Caldarise ....................... | 623/22 |
| 6,259,962 B1 | 7/2001 | Gothait .......................... | 700/119 |
| 6,521,173 B2 * | 2/2003 | Kumar et al. .................. | 419/23 |
| 7,146,709 B2 | 12/2006 | Wong ............................. | 29/599 |
| 7,480,978 B1 | 1/2009 | Wong ............................. | 29/599 |
| 8,071,016 B2 | 12/2011 | Campbell et al. .............. | 419/26 |
| 8,303,642 B1 | 11/2012 | Carlson ........................ | 623/1.15 |
| 2004/0183796 A1 | 9/2004 | Velde et al. .................... | 345/419 |
| 2007/0118243 A1 * | 5/2007 | Schroeder et al. ............ | 700/118 |
| 2008/0274002 A1 | 11/2008 | Lombardi ........................ | 419/10 |
| 2009/0044398 A1 | 2/2009 | Wong ............................. | 29/599 |
| 2011/0137419 A1 | 6/2011 | Wong .......................... | 623/16.11 |
| 2011/0147993 A1 | 6/2011 | Eshed et al. .................. | 264/308 |
| 2011/0161056 A1 | 6/2011 | Mueller ........................... | 703/1 |
| 2011/0204537 A1 * | 8/2011 | Liu et al. ...................... | 264/45.3 |

FOREIGN PATENT DOCUMENTS

| | | | |
|---|---|---|---|
| WO | WO2008039707 | 4/2008 | ............... H01G 9/00 |
| WO | WO2009082631 | 7/2009 | ............... H01G 9/00 |

OTHER PUBLICATIONS

International Search Report and the Written Opinion issued in corresponding application No. PCT/US2013/063915, dated Mar. 5, 2014 (9 pgs).
Fountain, H., "At the Printer, Living Tissue," article in The New York Times, Aug. 20, 2013 (2 pgs).
Erickson, et al., "Injection Molding," Metals Handbook, vol. 7, ninth edition, American Society for Metals, Metals Park, OH, 1984, pp. 495-500 (6 pgs).
Kirsner, S., "Formlabs may reshape things with its low-cost 3-D printer," article in The Boston Globe, Sep. 23, 2012 (2 pgs).
McCracken et al., "Production of a Spherical Hydride-Dehydride Titanium Powder," manuscript from the PowderMet2012 International Conference on Powder Metallurgy & Particulate Materials, Jun. 10-13, 2012, Nashville, TN (9 pgs).
McCracken, C., "Reading Alloys embarks on $7.2m expansion project," Powder Metallurgy, 2007, vol. 50, No. 3, pp. 203-204 (2 pgs).
McCracken, C., "Titanium Powder and its Alloys for Medical Applications," Reading Alloys, Advanced Engineered Materials, P.O. Box 53, Robesonia, PA 19551-0053, undated (2 pgs).
Müller et al., "Printing Thermoresponsive Reverse Molds for the Creation of Patterned Two-component Hydrogels for 3D Cell Culture," Journal of Visualized Experiments, Jul. 2013, Issue 77, e50632, pp. 1-9 (9 pgs).
Product data sheet and materials FAQs for "Aerosol Jet, 300 series systems," downloaded Oct. 15, 2013, www.optomec.com, (4 pgs).

* cited by examiner

*Primary Examiner* — George Wyszomierski
*Assistant Examiner* — Ngoclan T Mai
(74) *Attorney, Agent, or Firm* — Hayes Soloway P.C.

(57) ABSTRACT

The method for forming a 3-D metal object by 3-D printing or injection molding comprising providing as a feed material metal particles formed by establishing multiple metal components in a primary billet of a ductile material, working the primary billet through a series of reduction steps to form the components into elongated elements, leaching the ductile material from the elongated elements and reducing the length to short uniform lengths.

12 Claims, 4 Drawing Sheets

FIBER DIAMETER RESULT IS AN AVERAGE OF 1.44 UM
FIBER DIAMETER DISTRIBUTION FOR TANTALUM LOT PL168

Sample Identification: "168"
Sample Material: Tantalum Powder

Chemical Properties

| Element | (ppm) | Element | (ppm) |
|---|---|---|---|
| Al | 5 | Na | 1 |
| B | 2 | Nb | 33 |
| C | 11 | Ni | 4 |
| Ca | 1 | O | 1,500 |
| Co | 2 | P | 5 |
| Cr | 4 | S | 5 |
| Cu | 1 | Si | 2 |
| Fe | 6 | Sn | 4 |
| H | 62 | Ti | 2 |
| K | 5 | V | 2 |
| Mg | 1 | W | 87 |
| Mn | 4 | Zn | 1 |
| Mo | 4 | Zr | 2 |
| N | 292 | | |

C, H, N, O & S by LECO
Metallics by ICP-OES

FIG. 5

Chemical Analysis for Tantalum Lot PL 168

SYSTEM AND METHOD FOR FABRICATION OF 3-D PARTS

CROSS REFERENCE TO RELATED APPLICATIONS

This application claims priority from U.S. Provisional Application Ser. No. 61/712,669, filed Oct. 11, 2012, the contents of which are incorporated herein by reference.

FIELD OF THE INVENTION

The present invention relates to a system and method for creating 3-D parts. The invention has particular utility in connection with the manufacture of 3-D parts using sintered powdered metal manufacturing processes or solid free-form fabrication (SFF) or 3-D part printing processes, and will be described in connection with such utility, although other utilities are contemplated.

BACKGROUND OF THE INVENTION

The use of powdered metal (PIM) parts (powder injection molding manufacturing process) has accelerated in recent years for components difficult to manufacture by machining, and can offer a cost-effective alternative to other metal forming processes. Advantages of powdered metal manufacturing process include lower costs, improved quality, increased productivity and greater design flexibility. These advantages are achieved in part because powder metallurgy parts can be manufactured to net-shaped or near-net shape which in turn means little material waste, and also eliminates or minimizes machining. Other advantages of powdered metallurgy manufacturing process and parts produced therefrom, particularly over other metal forming processes, include greater material flexibility including graded structures or composite metal structures, lighter weight parts, greater mechanical flexibility, reduced energy consumption and material waste in the manufacturing process, high dimensional accuracy, good surface finish, controlled porosity, increased strength and corrosion resistance of the parts, and low machining costs, among others. However, production of high quality powder metal parts is dependent in large part on the quality of the powder metal. The smaller the metal particles and the more uniform the particles are in size and shape, the fewer voids and surface imperfections in the finished product.

Also, because the rate of diffusion is inversely proportional to the square of the particle size, shrinkage and densification of porous powder parts proceeds much more rapidly by minimizing particle size, with remnant pores in the formed part being smaller. Typical particle size used for injection molding are in the range of 0.5-20 µm and about 20-40 µm in the case of conventional powder metal processes, and presently are made as round spherical powders. See Erickson et al, Metals Handbook, Ninth Edition, Volume 7, Powder Metallurgy (2007) Injection Molding, pages 495-500.

Solid free-form fabrication (SFF) or so-called "3-D" printing of metal parts also has accelerated in recent years. So-called "3-D" printing" (also known as Rapid Prototyping and Manufacturing (RP&M)) is a method of creating three-dimensional objects by depositing or forming thin layers of material in succession so as to build up the desired 3-D structure. The process has some similarities to normal printing in that a digital representation of an object to be formed is used and each layer is formed as if it were one layer of printing, e.g. by moving some kind of printing head over a workpiece and activating elements of the printing head to create the "printing". Various methods have been devised to create the thin layers.

There are many items which can be produced by 3-D printing. However, until recently, most materials used in 3-D printing were polymerizable materials. As a result, the final product is not very strong or heat resistant, and 3-D printing heretofore primarily has been used in prototyping. However, recent advances in metallurgy have provided metal powders that can be used in 3-D printing of parts. In one technique metal powder is dusted onto a substrate and the powder coalesced by some means, e.g. by heating laser beam or electron beam, in accordance with the shape of the cross-section of the object to be formed. Yet another method involves dispensing drops of molten material at an elevated temperature which then solidify on contact with the cooler work piece.

SUMMARY OF THE INVENTION

The present invention, in one aspect, provides improved metal feed materials for use in 3-D fabrication processes including, but not limited to solid free-form fabrication systems including 3-D printing systems as well as metal molding systems, and the like. More particularly, the present invention provides metal particles that are quite uniform in size and shape. Typically the metal particles comprise uniform size and shape metal particles comprising short substantially uniform shaped particles, typically below about 50 µm in thickness, and preferably 0.5-50 µm, more preferably 0.5-10 µm, most preferably 0.5-5 µm in thickness or cross-section size.

Preferably the particles comprises a high value metal such as tantalum, or other metals including high value metals such as titanium, niobium, and zirconium and alloys thereof which are given as non-limiting examples. Accordingly, as used herein the term "metal" may include the metal of interest as well as an alloy thereof.

The metal particles are formed following the teachings of my prior PCT Application Nos. PCT/US07/79249 and PCT/US08/86460, or my prior U.S. Pat. Nos. 7,480,978 and 7,146,709.

The process starts with fabrication of high value metal coated wire or filaments, by combining shaped elements of the metal of interest, e.g., tantalum, with a ductile material such as copper to form a billet. The billet is then sealed in an extrusion can, and extruded and drawn following the teachings of my aforesaid PCT applications and aforesaid U.S. patents.

The drawn metal wire is then etched, e.g. in nitric acid, to remove the copper. The etched wire elements are then washed in water, and dried, and reduced to short uniformly shaped and uniformly sized metal particles of average thickness or cross section size of below about 50 µm, preferably 0.5-50 µm, more preferably 0.5-10 µm, most preferably 0.5 to 5 µm which can then be used for PIM and in an SFF process, such as a 3-D printing process.

BRIEF DESCRIPTION OF THE DRAWINGS

Further features and advantages of the present invention will be seen from the following detailed description taken in conjunction with the accompanying drawings, wherein like numerals depict like parts, and wherein:

FIG. 5 sets forth a chemical elemental analysis of titanium powder particles made in accordance with the present invention.

DETAILED DESCRIPTION

Figure 1:
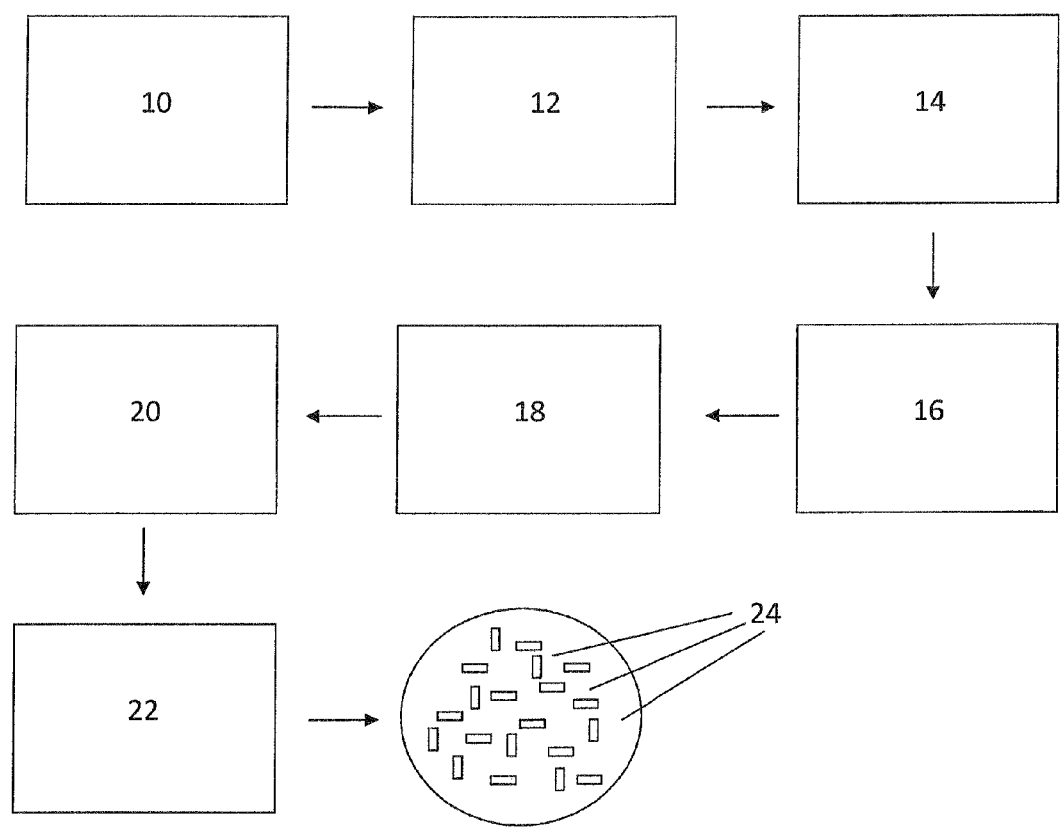
FIG. 1 diagrammatically shows the overall process for producing metal powder particles in accordance with the present invention.

Referring to FIG. 1, the process starts with the fabrication of high value metal filaments, such as tantalum, by combining shaped elements of tantalum with a ductile material, such as copper to form a billet at step 10. The billet is then sealed in an extrusion can in step 12, and extruded and drawn in step 14 following the teachings of my prior PCT Applications No. PCT/US07/79249 and PCT/US08/86460, or my prior U.S. Pat. Nos. 7,480,978 and 7,146,709.

The filaments are then passed to an etching station wherein the copper is removed by etching at step 16. In step 18, the filament are reduced to short uniform length particles, e.g. by means of a hydride-dehydride process. During milling of the brittle hydride elements, the short lengths can easily be obtained by crushing or grinding or using a blender/$H_2O$ which can be programmed to produce the required short lengths. The resulting particles are then washed in a washing step 20 and dried in a drying step 22 resulting in fine particles 24 of uniform slightly elongate shape and of uniform diameter. Preferably the particles have an aspect ratio (length to diameter) of about 1:1, about 5:1 or about 10:1.

Figure 2:
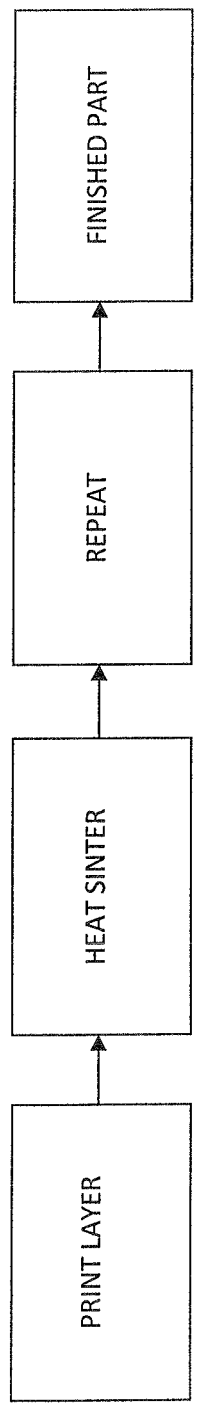
FIGS. 2 and 3 diagrammatically illustrate the use of the metal powder particles in manufacturing 3-D part.
Figure 3:
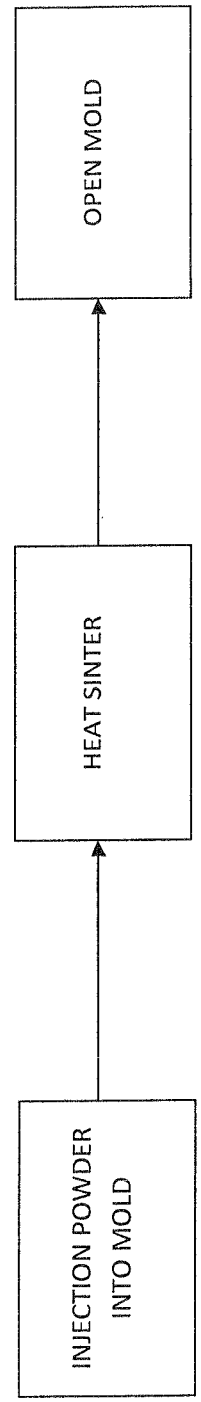

Referring to FIGS. 2 and 3, the uniform fine metal particles formed by the process of FIG. 1, may then be used in an SFF processor, deposited and bonded, melted or sintered in layers to build up a desired shape, or the particles may be used in a powder metal molding process to form shaped 3-D objects.

A feature and advantage of the present invention is the uniform size and shape of the metal particles provides for high density products with fewer voids. Round shape powders less than 20 μm are expensive and difficult to manufacture. In fact, using existing technology, it is not possible to manufacture powders much below 20 μm in size. With the present invention, particles produced will have a particle cross-section or thickness below about 0.5-50 μm, preferably about 0.5-10 μm, more preferably about 0.5-5 μm, which are particularly ideal for use in a 3-D printing process. The present invention offers an opportunity to manufacture extremely small and uniform size particles that advantageously can be used in 3D printing and injection molding. Also, the small diameter particles are flexible, which are particularly advantageous in an injection molding processes since the particles will flow into and completely fill a mold with little resistance. Additionally, the uniform elongate shape of the particles permits one to control the orientation of the products in the mold. Thus, the particles can align parallel to one another thus increasing green strength. Also, the extreme uniformity of the particles can be seen in FIG. 4.

Another important advantage is the slightly elongate particles will impart greater green strength to the parts than round powder, thus insuring greater freedom from distortion in thin sections and increase dimensional control after sintering.

It is well known that the final physical properties of the finished 3-D part depends on the purity of the alloy especially the interstitial elements such as oxygen and carbon. The combination of high purity in the particles made by this invention and by careful secondary treatments such as described will insure optimum performance in the finished part.

It should be understood that in addition to the high purity starting feed stock, additional purification can be obtained by subjecting the 3-D part to a final vacuum sintering at high temperatures and deoxidation treatments if needed.

Figure 4:
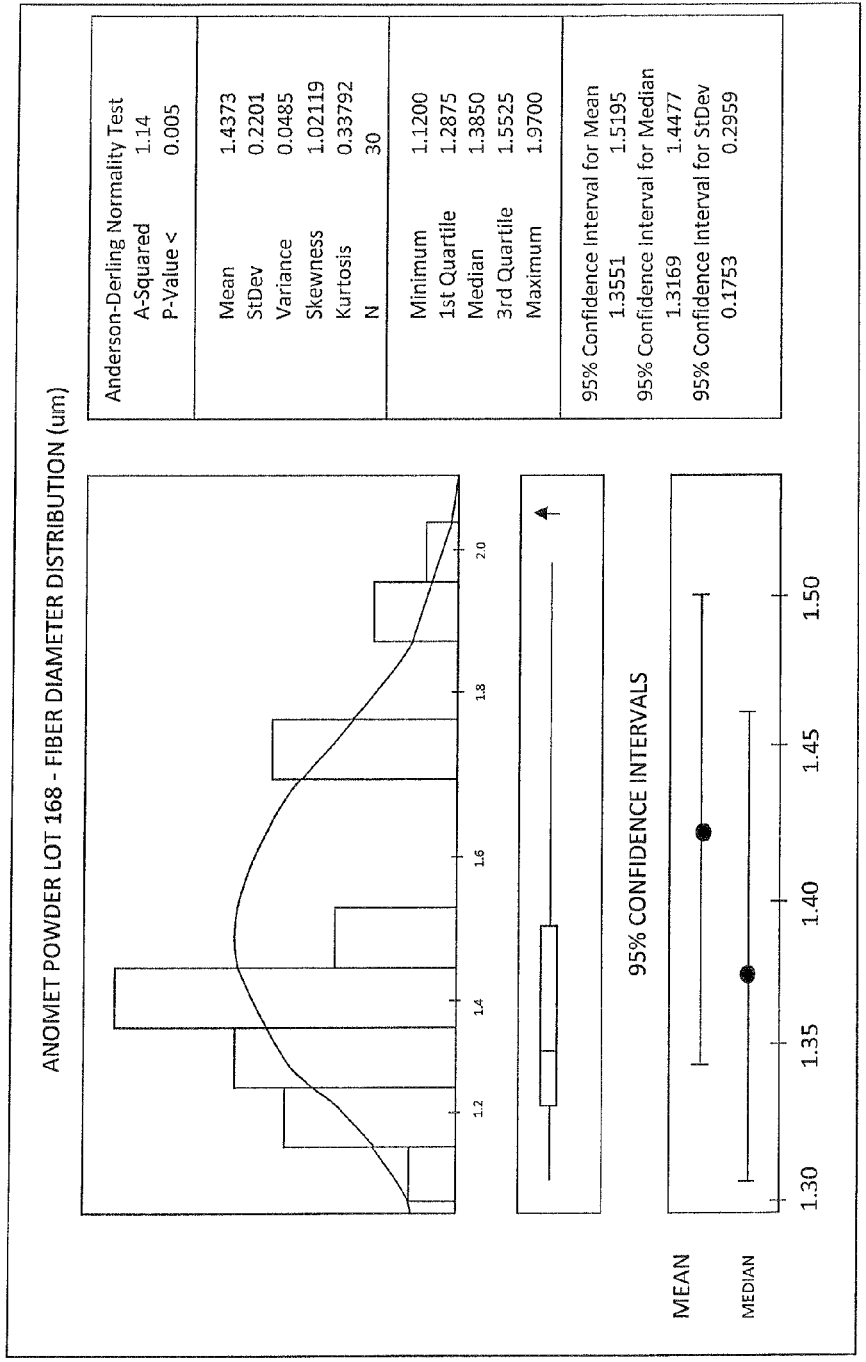
FIG. 4 is a graph of SEM images of metal powder particles made in accordance with the present invention.

An example of the chemical analysis obtained for Ta is shown in FIG. 5. The size of the Ta is 1.44 micron as shown in FIG. 4.

An important application of the 3-D printing process of the present invention is in the production of micro electronic devices such as tantalum capacitors. Presently, tantalum capacitors are individually made by first pressing a porous part using tantalum powders. A separate tantalum solid wire is inserted into the pressed anode and followed with sintering and dielectric formation. Using my 3-D printing technology as described in this application, Ta micro capacitors, together with their leads can be deposited and sintered in place easily.

Still other features and advantages of the present invention will be seen by one skilled in the art.

The invention claimed is:

1. The method for forming a 3-D metal object by 3-D printing or injection molding comprising providing as a feed material metal particles formed by establishing multiple metal components in a primary billet of a ductile material, working the primary billet through a series of reduction steps to form the components into elongated elements, leaching the ductile material from the elongated elements, reducing the elongated elements into a powder comprising substantially uniform size elongated particles having a length-to-diameter aspect ratio of about 5:1.

2. The method of claim 1, including the step of washing and drying the particles following leaching.

3. The method of claim 1, wherein the metal comprises a high value metal selected from the group consisting of titanium, niobium, tantalum, and zirconium or an alloy thereof.

4. The method of claim 1, wherein the elongated particles have a particle cross-sectional thickness 0.5 to 50 μm.

5. The method of claim 1, wherein the elongated particle have a particle cross-sectional thickness of 0.5 to 10 μm.

6. The method of claim 1, wherein the elongated particles have a particle cross-sectional thickness of 0.5 to 5 μm.

7. The method for forming a 3-D metal object by 3-D printing or injection molding comprising providing as a feed material metal particles formed by establishing multiple metal components in a primary billet of a ductile material, working the primary billet through a series of reduction steps to form the components into elongated elements, leaching the ductile material from the elongated elements, reducing the elongated elements into a powder comprising substantially uniform size elongated particles having a length-to-diameter aspect ratio of about 10:1.

8. The method of claim 7, including the step of washing and drying the particles following leaching.

9. The method of claim 7, wherein the metal comprises a high value metal selected from the group consisting of titanium, niobium, tantalum, and zirconium or an alloy thereof.

10. The method of claim 7, wherein the elongated particles have a particle cross-sectional thickness 0.5 to 50 μm.

11. The method of claim 7, wherein the elongated particle have a particle cross-sectional thickness of 0.5 to 10 μm.

12. The method of claim 7, wherein the elongated particles have a particle cross-sectional thickness of 0.5 to 5 μm.

* * * * *